(12) United States Patent
Foss et al.

(10) Patent No.: US 10,663,331 B2
(45) Date of Patent: May 26, 2020

(54) MAGNETIC FLOWMETER WITH POWER LIMIT AND OVER-CURRENT DETECTION (71) Applicant: Rosemount Inc., Chanhassen, MN (US)

(72) Inventors: Scot Ronald Foss, Eden Prairie, MN (US); Jared James Dreier, Chaska, MN (US); Samuel Ethan Messenger, Chaska, MN (US); Kirk Allan Hunter, Shakopee, MN (US)

(73) Assignee: Rosemount Inc., Shakopee, MN (US)

( * ) Notice: Subject to any disclaimer, the term of this patent is extended or adjusted under 35 U.S.C. 154(b) by 687 days.

(21) Appl. No.: 14/037,937

(22) Filed: Sep. 26, 2013

(65) Prior Publication Data
US 2015/0082906 A1   Mar. 26, 2015

(51) Int. Cl.
G01F 1/60   (2006.01)
G01F 25/00  (2006.01)

(52) U.S. Cl.
CPC ............ *G01F 1/60* (2013.01); *G01F 25/0007* (2013.01)

(58) Field of Classification Search
None
See application file for complete search history.

(56) References Cited

U.S. PATENT DOCUMENTS

| 2,696,737 | A | * | 12/1954 | Mittelmann | ............... | G01F 1/58 73/861.16 |
| 3,946,280 | A | * | 3/1976 | Quist | ................... | H02H 7/1227 330/207 P |
| 4,503,711 | A |   | 3/1985 | Bohn | | |
| 4,680,973 | A | * | 7/1987 | Kobayashi | ................ | G01F 1/60 73/861.16 |
| 4,741,215 | A |   | 5/1988 | Bohn et al. | | |
| 5,079,957 | A | * | 1/1992 | Wehrs | ........................ | G01F 1/60 73/861.17 |
| 5,137,045 | A | * | 8/1992 | Gerber | ................. | B22D 39/003 137/13 |
| 5,247,837 | A | * | 9/1993 | Corpron | .................. | G01F 1/584 73/861.11 |
| 5,325,728 | A | * | 7/1994 | Zimmerman | ........ | A61B 5/0265 73/861.12 |

(Continued)

FOREIGN PATENT DOCUMENTS

| CN | 101517377 A | * | 8/2009 | ............... G01F 1/60 |
| CN | 101517377 A |   | 8/2009 | |

(Continued)

OTHER PUBLICATIONS

International Search Report and Written Opinion, dated Dec. 1, 2014, for PCT Application No. PCT/US2014/051073, 9 pages.

(Continued)

Primary Examiner — Gregory J Toatley, Jr.
Assistant Examiner — Brandon J Becker
(74) Attorney, Agent, or Firm — Kinney & Lange, P.A.

(57) ABSTRACT

A magnetic flowmeter includes circuitry for sensing coil current, coil voltage, or coil resistance. Based on the sensed coil current, voltage, or resistance, a digital processor determines whether a power limit or a coil current limit is exceeded and either halts operation until it receives a new configuration with a new coil current setpoint, or determines a new coil current setpoint itself and adjusts the magnetic flowmeter to that new coil current setpoint.

7 Claims, 6 Drawing Sheets (56) References Cited

U.S. PATENT DOCUMENTS

| | | | |
|---|---|---|---|
| 5,372,045 A * | 12/1994 | Schulz | G01F 1/60 363/17 |
| 5,426,984 A * | 6/1995 | Rovner | G01F 1/002 73/861.12 |
| 5,436,824 A | 7/1995 | Royner et al. | |
| 5,530,639 A | 6/1996 | Schulz et al. | |
| 5,639,970 A | 6/1997 | Schulz | |
| 5,956,663 A | 9/1999 | Eryurek | |
| 6,021,162 A | 2/2000 | Gaboury et al. | |
| 6,174,136 B1 * | 1/2001 | Kilayko | F04B 17/046 417/44.1 |
| 6,460,731 B2 * | 10/2002 | Estelle | B05C 5/001 222/1 |
| 6,505,517 B1 * | 1/2003 | Eryurek | G01F 1/60 702/189 |
| 6,520,382 B2 * | 2/2003 | Estelle | B05C 5/001 222/146.1 |
| 6,539,981 B1 * | 4/2003 | Kleven | G01F 1/58 138/104 |
| 6,601,005 B1 | 7/2003 | Eryurek et al. | |
| 6,611,770 B1 * | 8/2003 | O'Donnell | G01D 3/032 702/45 |
| 6,615,149 B1 | 9/2003 | Wehrs | |
| 6,644,310 B1 * | 11/2003 | Delache | A61M 16/024 128/204.18 |
| 6,752,026 B1 * | 6/2004 | Hyde | G01F 1/586 73/861.15 |
| 6,763,729 B1 | 7/2004 | Matzen | |
| 6,975,219 B2 | 12/2005 | Eryurek et al. | |
| 7,010,459 B2 | 3/2006 | Eryurek et al. | |
| 7,073,393 B2 | 7/2006 | Coursolle | |
| 7,093,500 B2 | 8/2006 | Schulz et al. | |
| 7,353,119 B2 * | 4/2008 | Foss | G01F 1/60 702/45 |
| 7,461,562 B2 | 12/2008 | Schumacher | |
| 7,516,034 B1 | 4/2009 | Schulz | |
| 7,562,135 B2 | 7/2009 | Eryurek et al. | |
| 7,574,924 B1 * | 8/2009 | Feller | G01F 1/60 702/45 |
| 7,619,418 B2 * | 11/2009 | Schulz | G01F 15/068 324/520 |
| 7,637,169 B2 | 12/2009 | Shanahan et al. | |
| 7,750,642 B2 * | 7/2010 | Graber | G01F 25/0007 324/439 |
| 7,779,702 B2 | 8/2010 | Shanahan | |
| 7,921,733 B2 * | 4/2011 | Foss | G01F 1/586 73/861.12 |
| 7,938,020 B2 | 5/2011 | Diederichs | |
| 7,963,173 B2 | 6/2011 | Foss et al. | |
| 8,044,793 B2 * | 10/2011 | Eryurek | G05B 23/027 340/3.1 |
| 8,245,580 B2 | 8/2012 | Rogers | |
| 2001/0023876 A1 * | 9/2001 | Estelle | B05C 5/001 222/146.5 |
| 2002/0093336 A1 * | 7/2002 | Bernstein | G01R 33/3614 324/309 |
| 2002/0101682 A1 * | 8/2002 | Francis | G11B 5/5521 360/78.06 |
| 2002/0117009 A1 * | 8/2002 | Keech | G01F 1/60 73/861.17 |
| 2002/0183736 A1 * | 12/2002 | Francischelli | A61B 5/04 606/34 |
| 2008/0021377 A1 * | 1/2008 | Kienman | A61M 5/44 604/29 |
| 2009/0015236 A1 * | 1/2009 | Foss | G01F 25/0007 324/76.11 |
| 2010/0023876 A1 * | 1/2010 | Shuf | H04L 12/1827 715/753 |
| 2010/0188064 A1 * | 7/2010 | Mansfield | G01F 1/8413 323/299 |
| 2011/0014536 A1 | 1/2011 | Yoshida | |
| 2011/0216453 A1 | 9/2011 | Haines et al. | |

FOREIGN PATENT DOCUMENTS

| | | | | |
|---|---|---|---|---|
| CN | 102853869 A | * | 1/2013 | G01F 1/58 |
| CN | 102853869 A | | 1/2013 | |
| CN | 204027614 U | | 12/2014 | |
| DE | 10118001 A1 | | 10/2002 | |
| EP | 2074385 A2 | | 7/2009 | |
| JP | H02069490 | | 3/1990 | |
| JP | H05172600 A | | 7/1993 | |
| JP | 09325058 A | * | 12/1997 | |
| JP | H09325058 A | | 12/1997 | |
| JP | 2002340638 A | | 11/2002 | |
| JP | 2007315813 A | | 12/2007 | |
| JP | 2009168628 A | * | 7/2009 | |
| JP | 2009168628 A | | 7/2009 | |
| WO | WO 2008042290 A2 | * | 4/2008 | G01F 1/60 |

OTHER PUBLICATIONS

Extended European Search Report, for European Patent Application No. 14846897.8, dated May 4, 2017, 8 pages.
First Chinese Office Action dated Jul. 2, 2018, for corresponding Chinese Application No. 201410421838.8.
First Japanese Office Action, for Japanese Patent Application No. 2016-517421, dated Mar. 19, 2018, 6 pages.
Second Chinese Office Action dated Mar. 20, 2019 for corresponding Chinese Application No. 201410421838.8.

* cited by examiner

MAGNETIC FLOWMETER WITH POWER LIMIT AND OVER-CURRENT DETECTION

BACKGROUND

This invention relates generally to fluid processing, and specifically to process flow measurement and control.

Magnetic flowmeters (or magmeters) measure flow by Faraday induction, an electromagnetic effect. The magnetic flowmeter typically includes a flowtube and a transmitter. The flowtube includes a pipe, a field coil (or coils) mounted on the pipe, and electrodes that extend through the pipe. The transmitter energizes the field coil (or coils) to generate a magnetic field across a pipe section, and the magnetic field induces an electromotive force (EMF) across the process flow. The resulting potential difference (or voltage) is sensed using a pair of electrodes that extend through the pipe section and into contact with the process flow, or via capacitive coupling. The flow velocity is proportional to the induced EMF, and the volumetric flow rate is proportional to the flow velocity and flow cross-sectional area. The transmitter receives the sensed voltage from the electrodes and produces a signal representing measured flow.

In general, electromagnetic flow measurement techniques are applicable to water-based fluids, ionic solutions and other conducting flows. Specific uses include water treatment facilities, high-purity pharmaceutical manufacturing, hygienic food and beverage production, and chemical processing, including hazardous and corrosive process flows. Magnetic flowmeters are also employed in the hydrocarbon fuel industry, including hydraulic fracturing techniques utilizing abrasive and corrosive slurries, and in other hydrocarbon extraction and processing methods.

Magnetic flowmeters provide fast, accurate flow measurements in applications where differential pressure-based techniques are disfavored because of the associated permanent pressure loss (for example, across an orifice plate or Venturi tube). Magnetic flowmeters can also be used when it is difficult or impractical to introduce a mechanical element into the process flow, such as turbine rotor, vortex-shedding element or Pitot tube.

Some magnetic flowmeters use field coils driven directly by AC line power. Another type of magnetic flowmeter, commonly referred to as a pulsed DC magnetic flowmeter, excites or powers the field coil periodically with a low frequency square wave. Pulsed DC magnetic flowmeters utilize a magnetic field which changes direction at a certain frequency.

There are certain situations that can cause the power provided to the field coils to exceed the capabilities of the magnetic flowmeter. These can occur at initial startup as a result of a flowtube having different operating characteristics than the transmitter, or during normal operation due to changes in field coil resistance caused by terminal corrosion, or excessive temperature in process conditions and/or field coils.

Some of the symptoms that will be exhibited if the power limit is exceeded include: overheating and damaging the flowtube field coils or the transmitter electronics, or both; potentially dangerous surface temperature of the flowtube due to excess heating; and continual power cycling of the transmitter due to power starvation, which can prevent the user from switching the configuration of the magnetic flowmeter or observing any diagnostic warning messages.

In magnetic flowmeters, the coil current and the number of windings of the field coil(s) determine strength of the magnetic field perpendicular to the conductive process fluid flowing through the flowtube. The flow rate of the process fluid cutting across this magnetic field produces a small potential on the electrodes exposed to the process fluid. The signal produced on the electrodes is directly (linearly) proportional to flow rate for a given number of windings (turns) and the given coil current in the windings.

The circuitry typically used to drive the magnetic field, although stable and controllable in normal operating conditions, does not provide an independent or redundant current limitation in failure modes of the transmitter or the flowtube. A variety of methods have been used to limit current to field coil windings of a flowtube to ensure that the winding insulation is not damaged and does not exceed the thermal class (Class 180, Class 200, etc.) in failure conditions. These methods have employed inline resistive limiting (such as from simple resistors), fuses, or active semiconductors, such as power FETs or SCR's. Drawbacks of typical solutions can include unacceptable power loss, excessive over-temperature requirements, complex safety circuit topology sensitive to external transient conditions, and one-time use due to destructive interrupt.

SUMMARY

Magnetic flowmeter field coils and the associated transmitter circuitry are protected from damage by detecting conditions in which coil current exceeds an overcurrent limit or coil power exceeds a power limit. By use of a test current setpoint and a test frequency setpoint during a test period following initial startup of magnetic flowmeters, coil power can be determined during the test period based on sensed coil voltage and coil current. A normal coil current setpoint and normal frequency setpoint are then determined for normal operation of the magnetic flowmeter based on the coil power during the test period.

During normal operation, coil current or coil power can be monitored and compared to an overcurrent limit or a power limit. If the sensed coil current exceeds the overcurrent limit during a test period, operation of the magnetic flowmeter is inhibited, and an alarm or other warning message can be provided.

If the power limit or current limit is exceeded during normal operation, operation of the magnetic flowmeter may be inhibited, and an alarm produced. In addition, the coil current setpoint can be adjusted so that the current supply to the coil is at a level that produces coil power that does not exceed the coil power limit or the coil current limit. Thus allowing the transmitter to still measure flow while alerting the user of the issue.

DETAILED DESCRIPTION

Figure 1:
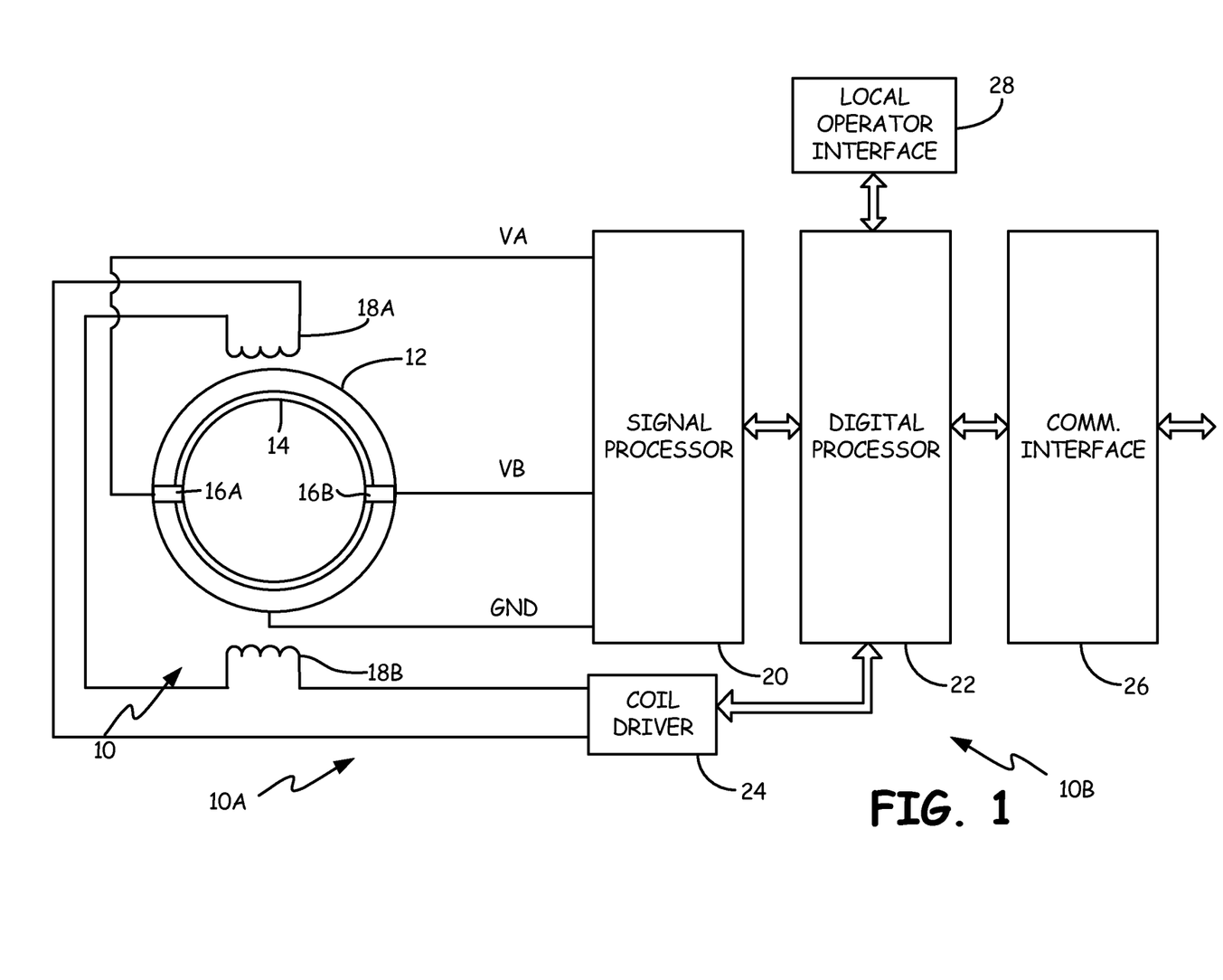
FIG. 1 is a block diagram of a magnetic flowmeter.

FIG. 1 shows an exemplary magnetic flowmeter 10, which includes primary section (or flowtube) 10A and secondary section (or transmitter) 10B. Flowtube 10A includes pipe 12, insulating liner 14, electrodes 16A and 16B, and field coils 18A and 18B.

The primary function of flowtube 10A is to produce a voltage proportional to the velocity of the fluid being measured. Field coils 18A and 18B are energized by passing a current through them to develop a magnetic field. In a pulsed DC magnetic flowmeter, the direction of the coil drive current is reversed periodically so that the magnetic field produced by field coils 18A and 18B changes direction. The process fluid flowing through the interior of flow pipe 10A functions as a moving conductor inducing a voltage in the fluid. Flush mounted electrodes 16A, 16B inside flowtube 10A are in direct electrical contact with the conductive process fluid, thereby picking up voltages present in the fluid. To prevent the voltage from being shorted, the fluid must be contained in an electrically insulating material. When pipe 12 is a metal tube, the insulation is provided by liner 14, which is a non-conducting material such as polyurethane, polytetrafluoroethylene (PTFE), or an insulating material.

Transmitter 10B interprets the voltage generated at electrode 16A and 16B and transmits a standardized signal to a monitoring or control system. Secondary section 10B is commonly referred to as a transmitter or signal converter.

Transmitter 10B typically includes signal processor 20, digital processor 22, coil driver 24, communication interface 26, and local operator interface 28. Signal conversion, conditioning, and transmission are the principal functions of transmitter 10B.

Digital processor 22 controls the pulse frequency of the pulsed DC coil drive current supplied by coil driver 24 to coils 18A and 18B. The current waveform provided by coil driver 24 is a square wave having a frequency referred to as the pulse frequency.

Signal processor 20 is connected to electrodes 16A and 16B and to ground. The ground connection may be to pipe 12, or may be to a flange or pipe section upstream or downstream of pipe 12.

During the electrode voltage sampling period defined by digital processor 22, signal processor 20 monitors potential VA at electrode 16A and potential VB at electrode 16B. Signal processor 20 produces a voltage representing the difference in potential between electrode 16A and 16B and converts that voltage into a digital signal representing electrode voltage during the electrode voltage sampling period. Digital processor 22 may perform further signal processing and filtering of the digital signals received from signal processor 20. Digital processor 22 supplies a flow measurement value to communication interface 26, which communicates that value to a read out or control system (not shown) which may be located at a control room. The communication by communication interface 26 can be in the form of an analog current level which varies between 4 and 20 mA; a HART® communication protocol in which digital information is modulated upon a 4-20 mA current; a communication protocol over a digital bus such as, for example, Fieldbus (IEC 61158); or wireless communication over a wireless network using a wireless protocol such as, for example, WirelessHART® (IEC 62951).

Figure 2:
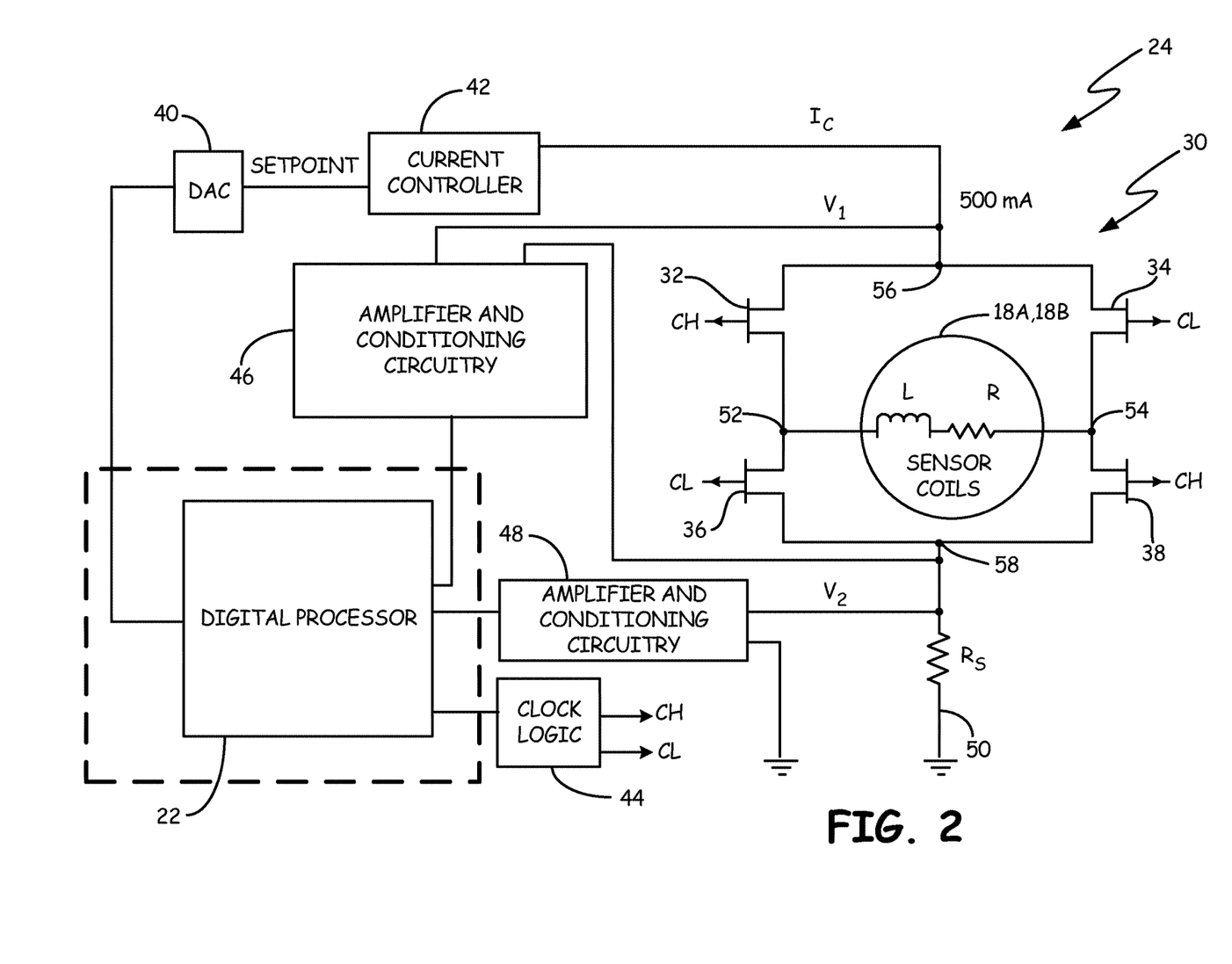
FIG. 2 is a block diagram showing coil driver and associated measurement circuitry for the flowmeter in FIG. 1.

FIG. 2 is a block diagram of coil driver 24, together with coils 18A and 18B and digital processor 22. Coil driver 24 includes H-bridge 30 formed by field effect transistors (FET) 32, 34, 36, and 38, digital to analog converter (DAC) 40, current controller 42, clock logic 44, coil voltage amplifier and conditioning circuitry 46, coil current amplifier and conditioning circuitry 48, and sense resistor 50. Sensor coils 18A and 18B are connected in series between nodes 52 and 54 of H-bridge 30. As shown in FIG. 2, sensor coils 18A, 18B present coil inductance L and coil resistance R between nodes 52 and 54.

Digital processor 22 controls the coil current setpoint and pulse frequency of the drive signal supplied through H-bridge 30 to coils 18A, 18B. The frequency of the drive is controlled by digital processor 22 through clock logic 44, which produces clock signals CH and CL. Clock signal CH turns transistors 32 and 38 of H-bridge 30 on and off. Clock signal CL turns transistors 34 and 36 of H-bridge on and off. When transistors 32 and 38 are turned on by clock signal CH and transistors 34 and 36 are turned off by clock signals CL, current flows from node 56 of H-bridge 30 through transistor 32 to node 52, through coils 18A, 18B in the first direction to node 54, through transistor 38 to node 58 of H-bridge 30, and through sense resistor 50 to ground. When clock signal CL turns transistors 34 and 36 on and clock signal CH turns transistors 32 and 38 off, current flows from node 56 of H-bridge 30 through transistor 34 to node 54, through coils 18A, 18B in a second direction to node 54, and through transistor 36, node 58 and sense resistor 50 to ground.

The current delivered to H-bridge 30 is controlled by digital processor 22 through DAC 40. A digital control signal from digital processor 22 causes DAC 40 to produce an analog voltage representing a setpoint current to the input of current controller 42. Coil current $I_C$, which is a function of the current setpoint signal supplied to current controller 42, flows from current controller 42 to node 56 of H-bridge 30 and then flows through coils 18A, 18B in either a first direction when transistors 32 and 38 are turned on or a second direction when transistors 34 and 36 are turned on. Coil current $I_C$ then flows through sense resistor 50 to ground.

According to one embodiment, coil driver 24 includes amplifier and conditioning circuitry 46 to sense coil voltage, and amplifier and conditioning circuitry 48 to sense coil current. The inputs to amplifier and conditioning circuitry 46 are connected to nodes 56 and 58 of H-bridge 30. The output of amplifier and conditioning circuitry 46 is supplied to an input of an onboard analog-to-digital converter (ADC) of digital processor 22. The inputs of amplifier and conditioning circuitry 48 are connected to node 58 of H-bridge 30 and to ground. Voltage V2 at the input of amplifier and conditioning circuitry 48 is equal to coil current k times resistance $R_S$ of sensor resistor 50, i.e., $V2=I_C R_S$.

Based upon signals received from amplifier and conditioning circuitry 46 and amplifier and conditioning circuitry 48, digital processor 22 produces digital values representing coil voltage $V_C$ and coil current $I_C$. With these values, digital processor 22 identifies over power and over current conditions that can potentially damage coils 18A, 18B of flowtube 10A or circuitry of transmitter 10B.

The power used by coils 18A, 18B can be calculated using coil current and coil voltage measurements by digital processor 22 in conjunction with amplifier and conditioning circuitry 46 and 48. Coil current $I_C=V2/R_S$. Coil voltage $V_C=V1-V2$. Once coil current $I_C$ and coil voltage $V_C$ are measured, resistance R of sensor coils 18A, 18B can be calculated by the following equation: $R=V_C/I_C$. Coil power $P_C$ is then calculated by digital processor 22 using the formula $P_C=I^2R$, where I is the coil current setpoint. Alternatively, current I could be the measured current $I_C$, or could be the maximum of the measured current and the coil current setpoint.

Coil Power Check—Power Up

One scenario where an overpower condition can occur is at initial power up of magnetic flowmeter 10. This can occur when flowtube 10A and transmitter 10B are from different manufacturers. The coil resistance of commercially available flowtubes can vary significantly, such as from about 2 ohms to 150 ohms or higher. With a flowtube having coil resistance of about 10 ohms, a coil current setpoint of 500 milliamps (mA) may be provided by coil driver 24. Transmitter 10B has a maximum power that is capable of providing. In this example, that maximum power may be 9 watts. Solving the equation $P=I^2R$ for R gives a maximum coil resistance of $R=P/I^2=9$ watts/$(0.5$ amps$)=36$ ohms.

Flowtubes having higher coil resistance are typically driven at current setpoints such as 125 mA or 75 mA, rather than 500 mA. A flowtube having a resistance greater than 36 ohms is connected to a transmitter that provides a 500 mA setpoint current for driving the coils, the power limit can be exceeded. As a result, coils 18A, 18B can overheat and become damaged. In addition, transmitter electronics of transmitter 10B can overheat and be damaged. Excess heating at coils 18A, 18B can produce potentially dangerous surface temperatures. Transmitter 10B may also power cycle due to power starvation. This can prevent the user from switching magnetic flowmeter 10 to a different operating mode, such as universal mode to work with different manufacturers' tubes, or from seeing diagnostic messages provided at local operator interface 28 or the control room that receives flow measurements and diagnostic messages sent by communication interface 26.

In this initial power up scenario, digital processor 22 selects an operating condition that will avoid exceeding the coil power limit, regardless of the coil resistance of flowtube 10A that is connected to transmitter 10B. During initial set up, therefore, digital processor 22 provides an initial test current setpoint that is low enough so that the power limit will not be exceeded at any of the potential coil resistance values that may be encountered. This allows digital processor 22 to determine the coil resistance of flowtube 10A and then determine whether the coil current setpoint for normal operation, when used with that calculated coil resistance, would exceed the coil power limit.

Figure 3:
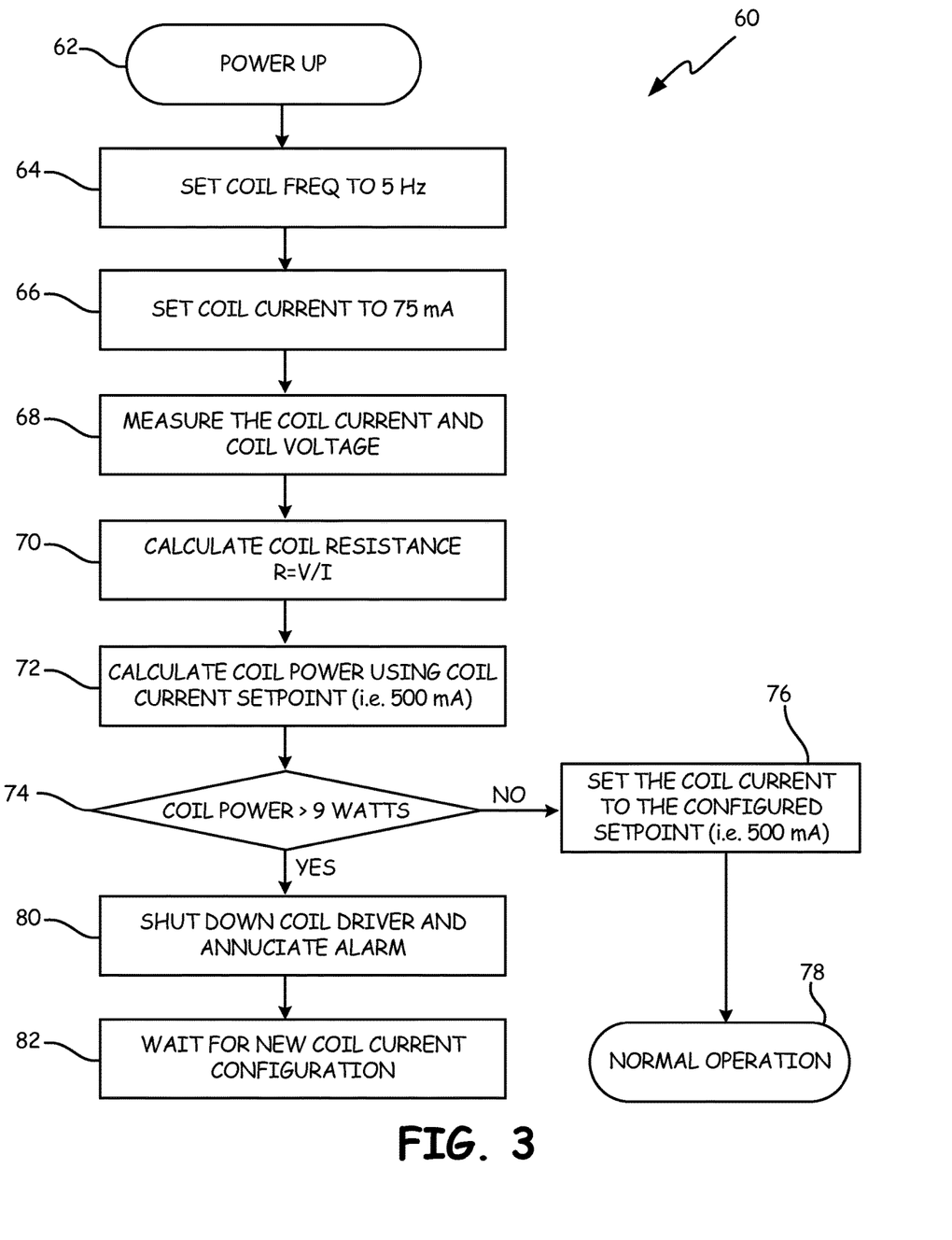
FIG. 3 is a flow diagram illustrating a coil power check performed at initial powerup of the magnetic flowmeter.

FIG. 3 is a flow diagram illustrating a coil power check at power up. Power check process 60 begins with initial power up of transmitter 10 (step 62). Digital processor 22 then sets the coil drive frequencies coil driver 24 to 5 Hz (step 64) and sets the test coil current setpoint to 75 mA (step 66).

Coil driver 24 provides digital processor 22 with outputs from amplifier and conditioning circuitry 46 and 48. Digital processor 22 uses the outputs of amplifier and conditioning circuitry 46 and 48 to measure coil current $I_C$ and coil voltage $V_C$ (step 68).

Digital processor 22 then calculates coil resistance using measured coil voltage $V_C$ and coil current $I_C$ (step 70).

Digital processor 22 then calculates coil power using its normal operating coil current setpoint. In this example, the normal coil current setpoint is 500 mA (step 72). Digital processor 22 then determines whether the calculated coil power using the normal operating coil current setpoint exceeds the coil power limit, in this example 9 watts (step 74).

If the calculated coil power using the normal operating coil current setpoint does not exceed the coil power limit, digital processor 22 sets the coil current delivered by coil driver 24 to the configured normal setpoint, such as 500 mA. Transmitter 10B and flowtube 10A then enter normal operation in which an alternating pulsed DC current drive supplied by transmitter 10B to coils 18A, 18B, and voltages VA and VB are sensed at electrodes 16A and 16B, respectively. Voltages VA and VB are processed by signal processor 20 and used by digital processor 22 to provide the measurement signal representing flow rate of fluid through flowtube 10A.

If the calculated coil power using the configured coil current setpoint exceeds the coil power limit, then digital processor 22 shuts down coil driver 24 and annunciates an alarm through local operator interface 28 or through communication interface 26 (step 80). Transmitter 10B then waits for a new coil current configuration to be provided, before again going through the coil power check at initial power up. The new coil current configuration may be provided by a user through local operator interface 28, or may be provided from a control room over a communication link to communication interface 26 (step 82).

Once a new coil current configuration has been entered, process 60 will be repeated. At step 72, when coil power is calculated, the new coil current setpoint based on the new configuration will be used. At step 74, digital processor 22 will again determine whether the calculated coil power exceeds the coil power limit. If the new coil current configuration results in calculated coil power that is below the coil power limit, then the new coil current configuration will be used in setting the coil current (step 76) and normal operation will then begin (step 78). If calculated coil power using the new coil current configuration still exceeds the coil power limit, then steps 80 and 82 are repeated.

Coil Power Check—Normal Operation

Figure 4A:
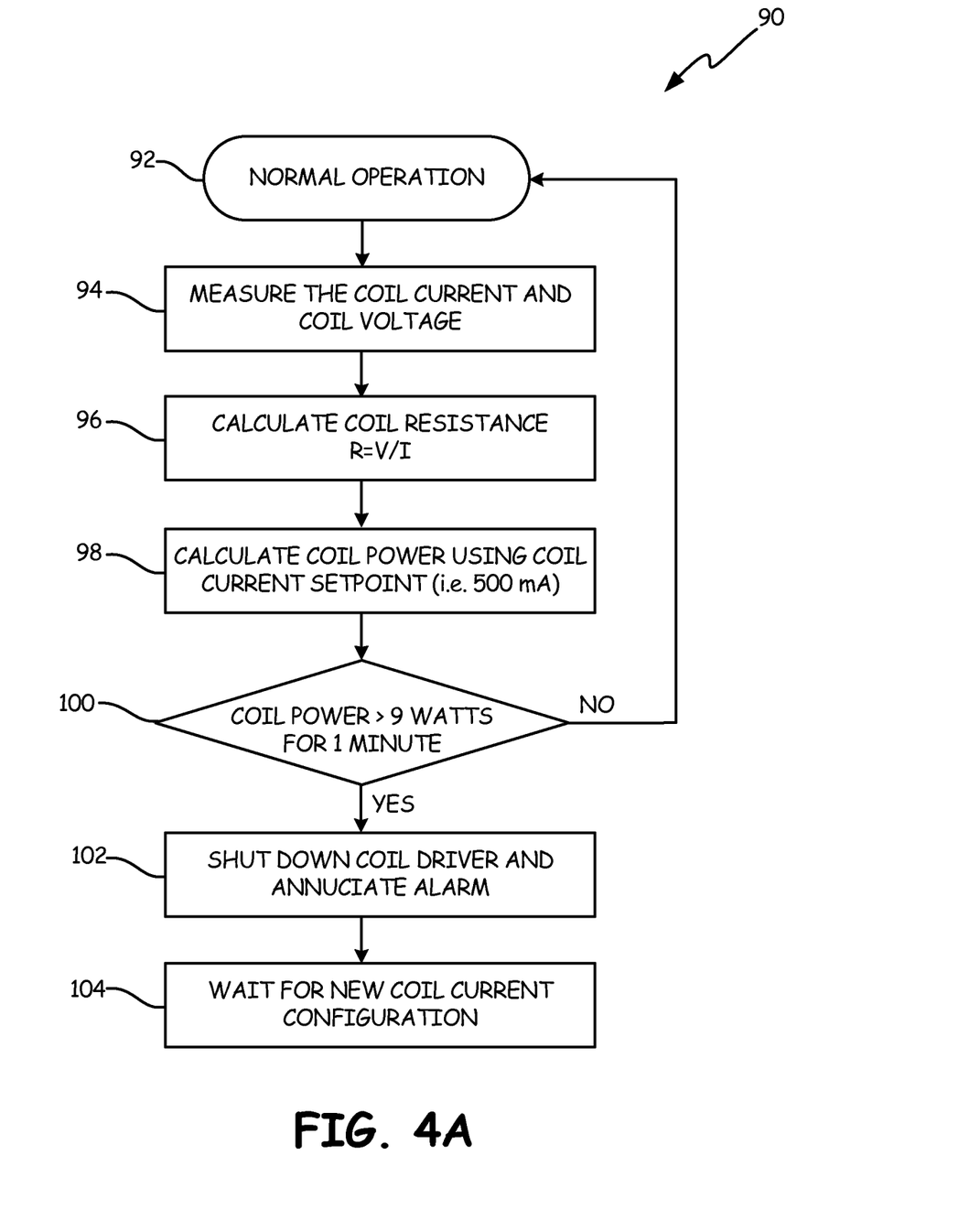
FIGS. 4A and 4B are flow diagrams illustrating two embodiments of a coil power check performed during normal operation of the magnetic flowmeter.

Another scenario involves coil resistance changes over time during normal operation of the magnetic flowmeter. In this scenario, the coil resistance changes over time due to process temperatures, self-heating, or terminal corrosion. FIG. 4A shows process 90, which is performed by digital processor 22 as a coil power check while magnetic flowmeter 10 is running. During normal operation (step 92), digital processor 22 measures coil current $I_C$ and coil voltage $V_C$ based upon signals received from amplifier and conditioning circuitry 46 and 48 of coil driver 24 (step 94). Digital processor 22 calculates coil resistance R by dividing coil voltage $V_C$ by coil current $I_C$ (step 96). Using calculated coil resistance R and the coil current setpoint (such as 500 mA), digital processor 22 calculates coil power $P=I^2R$.

Digital processor 22 then determines whether the calculated coil power exceeds the coil power limit (in this case 9 watts) for one minute. If coil power has not been continuously above 9 watts for at least one minute, digital processor 22 returns to normal operation (step 92) and repeats steps 94, 96, 98, and 100 with the next half cycle of the alternating DC current drive. As long as coil power does not exceed 9 watts for greater than one minute, this loop continues, and magnetic flowmeter 10 operates in its normal operation without interruption.

If coil power exceeds 9 watts for a one minute period, digital processor 22 shuts down coil driver 24 and annunciates an alarm through local operator interface 28, communication interface 26, or both (step 102). Once magnetic flowmeter 10 has been shut down and an alarm generated digital processor 22 waits for a new coil current configuration to be supplied through either local operator interface 28 or communication interface 26 (step 104).

Once a new coil current configuration has been received, magnetic flowmeter 10 can return to operation by first going through the coil power check at power up shown as process 60 in FIG. 3. Once magnetic flowmeter 10 passes the coil power check at power up and enters normal operation, process 90 resumes.

Figure 4B:
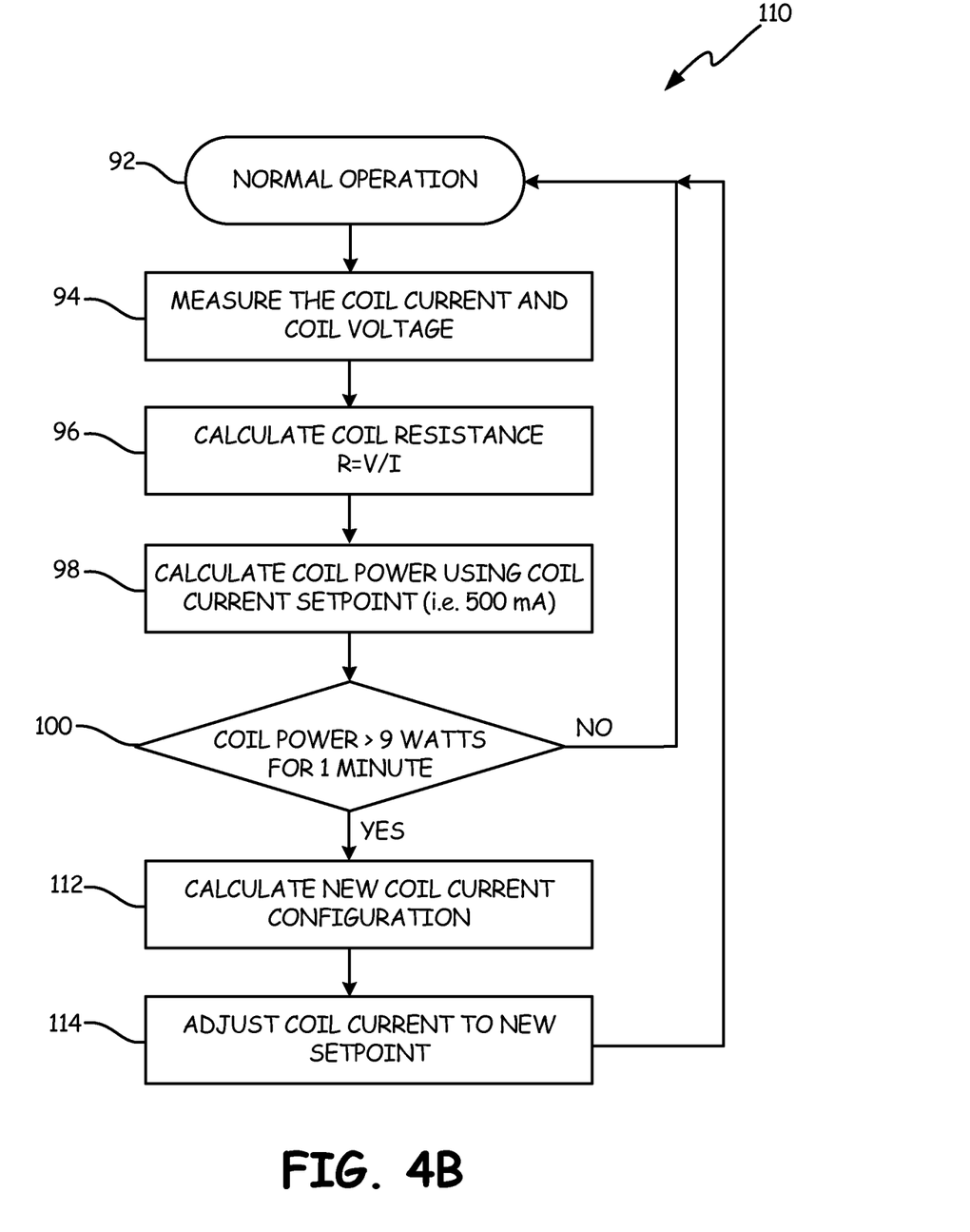

FIG. 4B shows an alternative coil power check while magnetic flowmeter 10 is running in normal operation. Process 110 is similar to process 90 of FIG. 4A, and includes steps 92, 94, 96, 98, and 100 like process 90. Process 110 differs from process 90 in the event that coil power exceeds the coil power limit for more than one minute it will lower the coil current setpoint to reduce coil power. In process 110, digital processor 22 calculates a new coil current setpoint using the measured coil resistance and a coil power target that is below the coil power limit (step 112). Digital processor 22 then provides a control signal to automatically adjust the coil current setpoint of current controller 42 to a current level that will maintain coil power below the coil power limit (step 114). Once the coil current has been adjusted to the new setpoint, digital processor 22 returns to normal operation (step 90) at the reduce coil current so a flow measurement is still available. In this situation a warning can be asserted to alert the user.

Coil Overcurrent Monitoring

Magnetic flowmeter 10 can also provide a magnetic coil drive overcurrent detection feature using the coil current sensed using sense resistor 50 and amplifier and conditioning circuitry 48 of coil driver 24 (see FIG. 2). This overcurrent detection works in conjunction with the constant current control coil driver 24 shown in FIG. 2, and can eliminate the need for hardware based current limitation devices such as resistors, fuses, or TRIACs. The overcurrent detection feature can be performed with each flow measurement cycle, and can provide an automatic shutdown of coil driver 24 if coil current exceeds a coil current limit for a specified time period, such as one minute.

Figure 5:
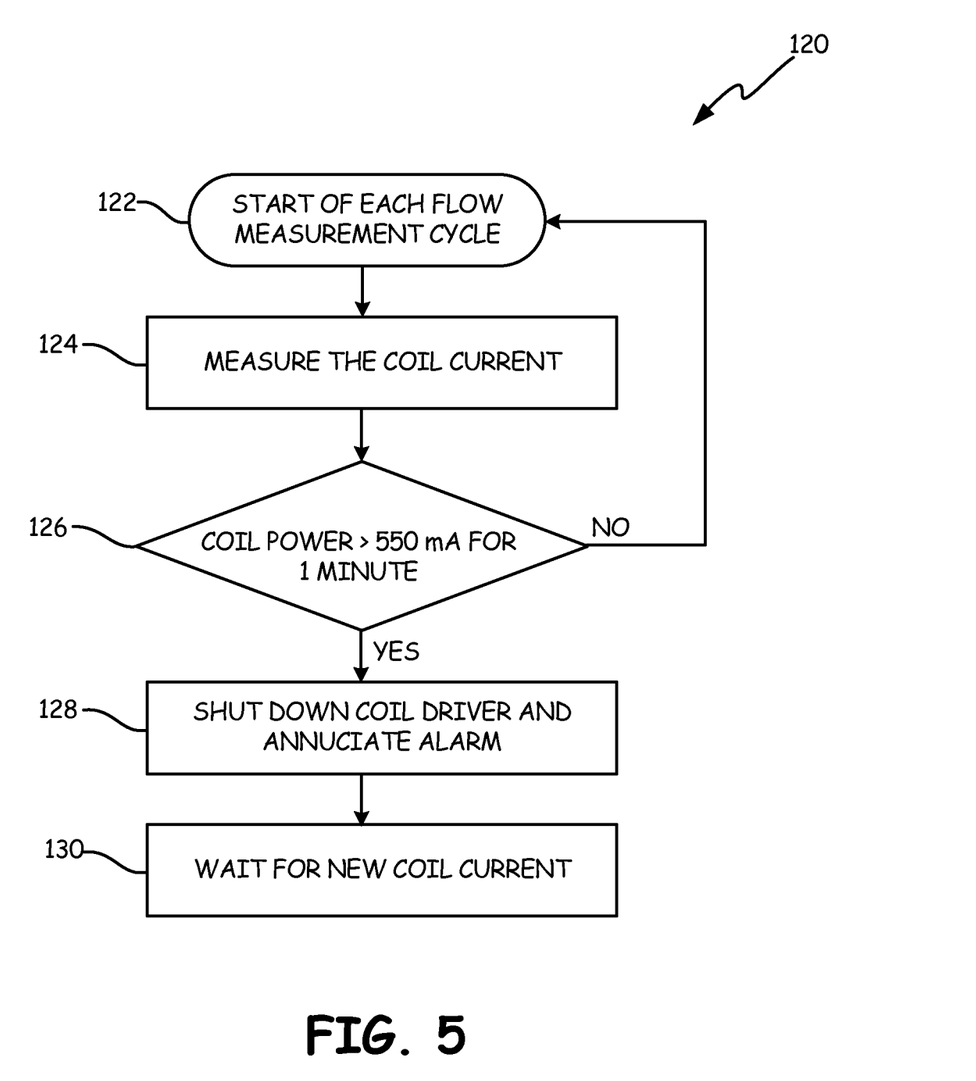
FIG. 5 is a flow diagram illustrating a coil overcurrent check during operation of the magnetic flowmeter.

FIG. 5 illustrates coil overcurrent monitoring process 120, which is performed by digital processor 22 on a continual basis during normal operation of magnetic flowmeter 10. The coil overcurrent monitoring is performed at the start of each flow measurement cycle (step 122). Digital processor 22 measures coil current $I_C$ by sensing voltage V2 using amplifier and conditioning circuitry 48 of FIG. 2 (step 124). Voltage V2 is divided by resistance $R_S$ of sense resistor 50 to yield measured coil current $I_C$.

Digital processor 22 compares measured coil current $I_C$ to a coil current limit value (in this example 550 mA). If the measured coil current $I_C$ has remained above the coil current limit for one minute or more, digital processor 22 shuts down coil driver 24 and annunciates a soft alarm through local operator interface 28 or communication interface 26. Digital processor 22 then waits for a new coil current configuration to be provided through local operator interface 28 or communication interface 26 (step 130).

As long as the coil current has not exceeded the coil current limit for more than one minute, digital processor 22 will continue the loop that includes steps 122, 124, and 126, and magnetic flowmeter 10 will continue to operate in its normal operation mode.

In another embodiment, digital processor 22 can use the power calculations to automatically adjust coil current to a maximum acceptable power, which will give the most signal at electrodes 16A, 16B. This optimizes the signal-to-noise ratio for the particular flow tube being used. Coil current is directly related to flow signal strength at electrodes 16A, 16B. In still other embodiments, a user desiring lower power consumption can set a lower power limit for transmitter 10B. Digital processor 22 can then limit coil power based on that lower coil power limit.

The coil overcurrent monitoring has a number of advantages over previous approaches using fuses, breakers, or other circuitry such as SCR or crow-bar type devices. It uses current sensing in coil driver 24 together with digital processor 22 to turn off coil driver 24 when an over current condition is detected. Precise coil current limitation is provided and is variable over a wide range of coil current setpoints (e.g., 75 mA to 500 mA). The current monitoring provides current limitation that is resettable is not damaged by transient events, and is unaffected by temperature. The current monitoring can limit power to field coils for example to 120% of nominal power, versus 565% of nominal power using typical fusing methods.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of controlling operation of a magnetic flowmeter that includes a flowtube and a transmitter, the method comprising:
    executing, in the transmitter, a loop during normal operation, the loop including:
    supplying, during an electrode voltage sampling period, a coil current from a coil driver of the transmitter to a coil of the flowtube to generate a magnetic field across a process flow through the flowtube, the coil current based upon a coil current setpoint;
    measuring a voltage difference across the process flow induced by the magnetic field;
    producing, based on the measured voltage difference, a signal indicative of a flow rate of the process flow;
    sensing the coil current;
    sensing coil voltage;
    determining a coil resistance of the coil based upon the sensed coil current and the sensed coil voltage;
    determining coil power based on the coil current setpoint and the coil resistance during the electrode voltage sampling period; and
    evaluating whether the coil power determined exceeds a coil power limit value;
    repeating the loop if the coil power determined does not exceed the coil power limit;
    interrupting normal operation if the coil power exceeds the coil power limit by:
    shutting down the coil driver when the coil power determined exceeds the coil power limit; and
    annunciating an alarm using the transmitter.

2. A method of controlling operation of a magnetic flowmeter, the method comprising:
    executing, in the transmitter, a loop during normal operation, the loop including:
    supplying, during an electrode voltage sampling period, a coil current at a coil current setpoint level of the transmitter to a coil of a the flowtube to generate a magnetic field across a process flow through the flowtube;
    sensing a voltage across the process flow induced between sensing electrodes by a magnetic field produced by current flow in the coils;

producing, based on the voltage induced between the sensing electrodes, a signal indicative of a flow rate of the process flow;

sensing coil current during the electrode voltage sampling period;

sensing coil voltage during the electrode voltage sampling period;

determining a coil resistance based on the sensed coil current and the sensed coil voltage;

determining a coil power using the coil resistance and a coil current setpoint; and evaluating whether the coil power determined exceeds a power limit level for a time period;

repeating the loop when the coil power determined does not exceed the power limit level for the time period;

interrupting normal operation when the coil power determined exceeds the power limit level for the time period by:

determining a new coil current setpoint based upon the sensed resistance of the coil; and adjusting the coil current setpoint to the new coil current setpoint; and resuming normal operation in response to the coil current setpoint being adjusted.

3. A method of controlling operation of a magnetic flowmeter including a flowtube and a transmitter, the method comprising:

executing, in the transmitter, a loop during normal operation, the loop including:

supplying, during an electrode voltage sampling period, coil current to a coil of flowtube to generate a magnetic field across a process flow through the flowtube using a coil driver of the transmitter;

measuring a voltage difference across the process flow;

producing, based on the measured voltage difference, a signal indicative of a flow rate of the process flow;

sensing coil current and coil voltage during the electrode voltage sampling period;

calculating coil resistance based on the sensed coil current and sensed coil voltage using a digital processor of the transmitter; and calculating coil power based on coil resistance and a coil current setpoint using the digital processor of the transmitter;

inhibiting normal operation of the magnetic flowmeter when the calculated coil power exceeds a power limit value;

determining an adjusted coil current setpoint at which the calculated coil power is less than the power limit value;

initiating normal operation of the magnetic flowmeter using the adjusted coil current setpoint; and repeating the loop if the calculated coil power does not exceed the power limit value.

4. A method of controlling operation of a magnetic flowmeter that includes a flowtube and a transmitter, the method comprising:

executing, in the transmitter, a loop during normal operation, the loop including:

supplying, during an electrode voltage sampling period, coil current to a coil of a magnetic flowmeter to generate a magnetic field across a process flow through the flowtube;

measuring a voltage difference across the process flow induced by the magnetic field;

producing, based on the measured voltage difference, a signal indicative of a flow rate of the process flow;

measuring resistance of the coil of the magnetic flowmeter during the electrode voltage sampling period; and calculating coil power based on the resistance of the coil and a coil current setpoint using a digital processor of the transmitter;

inhibiting normal operation of the magnetic flowmeter and annunciating an alarm when the coil power calculated exceeds a power limit by shutting down the coil driver; and resuming normal operation of the magnetic flowmeter using a new coil current setpoint.

5. A transmitter for use with a magnetic flowtube, the transmitter comprising:

a coil driver for supplying, during an electrode voltage sampling period, a current to a coil of the magnetic flowtube, the current based upon a coil current set point, the coil driver including circuitry for sensing coil current and coil voltage;

sensing electrodes configured to sense a voltage across a process flow induced by a magnetic field produced the current supplied to the coil of the magnetic tube; and a processor configured, during normal operation, to repeatedly execute the steps of:

determining coil power based on sensed coil current and sensed coil voltage during the electrode voltage sampling period;

controlling the coil driver when the coil power determined exceeds a coil power limit value by reducing the current supplied to the coil so as to maintain the coil power below the coil power limit; and repeating the previous steps when the coil power determined does not exceed the coil power limit.

6. A method of controlling power up of a magnetic flowmeter including a flowtube and a transmitter, the method comprising:

supplying a coil current to a coil of the magnetic flowtube from a coil driver of the transmitter, the coil current based upon a coil frequency set point and a coil current set point;

sensing the coil current;

sensing the coil voltage;

determining a coil power of the coil based upon the coil current setpoint and the sensed coil voltage;

determining whether the coil power exceeds a coil power limit; and if the coil power does not exceed the coil power limit:

setting the coil current to a configured coil current setpoint; and initiating normal operation of the magnetic flow meter with the configured current setpoint;

if the coil power does exceed the coil power limit:

shutting down the coil driver; and annunciating an alarm.

7. The method of claim 6, further comprising:

determining a coil resistance of the coil based upon the sensed coil current and the sensed coil voltage, wherein determining a coil power of the coil based upon the coil current setpoint and the sensed coil voltage includes determining coil power of the coil based upon the coil current setpoint and the determined coil resistance.

* * * * *